(12) United States Patent
Koyasu et al.

(10) Patent No.: US 8,406,999 B2
(45) Date of Patent: Mar. 26, 2013

(54) NAVIGATION DEVICE

(75) Inventors: Takehiko Koyasu, Tokyo (JP); Atsushi Kohno, Tokyo (JP); Wataru Yamazaki, Tokyo (JP); Yuta Kawana, Tokyo (JP); Fumitaka Satou, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 12/991,921

(22) PCT Filed: Apr. 22, 2009

(86) PCT No.: PCT/JP2009/001841
§ 371 (c)(1),
(2), (4) Date: Nov. 10, 2010

(87) PCT Pub. No.: WO2009/150781
PCT Pub. Date: Dec. 17, 2009

(65) Prior Publication Data
US 2011/0066368 A1    Mar. 17, 2011

(30) Foreign Application Priority Data
Jun. 11, 2008   (JP) .................................. 2008-153087

(51) Int. Cl.
  *G01C 21/00*  (2006.01)
  *G08G 1/0969*  (2006.01)
  *G06F 19/00*  (2006.01)
(52) U.S. Cl. .................... 701/426; 701/438; 340/995.16
(58) Field of Classification Search .................. 701/426, 701/438, 408, 532, 533, 117; 340/995.16, 340/905, 995.1; 705/13
See application file for complete search history.

(56) References Cited

U.S. PATENT DOCUMENTS

| | | | | |
|---|---|---|---|---|
| 6,128,571 A | * | 10/2000 | Ito et al. | 701/426 |
| 6,434,482 B1 | | 8/2002 | Oshida et al. | |
| 6,542,814 B2 | * | 4/2003 | Polidi et al. | 701/454 |
| 7,155,339 B2 | * | 12/2006 | Tu | 701/426 |
| 7,472,019 B2 | * | 12/2008 | Hara | 701/426 |
| 7,490,004 B2 | * | 2/2009 | Kimura | 701/426 |
| 8,145,421 B2 | * | 3/2012 | Tabata | 701/408 |
| 2005/0049779 A1 | | 3/2005 | Yasuda et al. | |

FOREIGN PATENT DOCUMENTS

| | | |
|---|---|---|
| DE | 10 2004 009 872 A1 | 9/2004 |
| EP | 1 936 519 A1 | 6/2008 |
| JP | 2001-21376 A | 1/2001 |
| JP | 2004-170233 A | 6/2004 |
| JP | 2004-239650 A | 8/2004 |
| JP | 2005-77126 A | 3/2005 |
| WO | WO 2007/037281 A1 | 4/2007 |

* cited by examiner

*Primary Examiner* — Tan Q Nguyen
(74) *Attorney, Agent, or Firm* — Birch, Stewart, Kolasch & Birch, LLP

(57) ABSTRACT

A navigation device includes a map information acquiring unit 47 and 48 for acquiring map information, a positioning unit 46 for measuring a vehicle position, an input unit 34 and 45 for inputting a search condition for a search for facilities which are search objects, a facility searching unit 50 for, when the vehicle position measured by the positioning unit is located on a dedicated road whose exits and entrances are predetermined, searching through the map information acquired by the map information acquiring unit for facilities existing on the dedicated road and facilities existing at a predetermined distance or less from an exit of the dedicated road, those facilities satisfying the search condition inputted from the input unit, and a display unit 32 and 43 for displaying the facilities searched for by the facility searching unit in order of increasing distance from the vehicle position measured by the positioning unit.

10 Claims, 10 Drawing Sheets

Vehicle Position

FIG.6
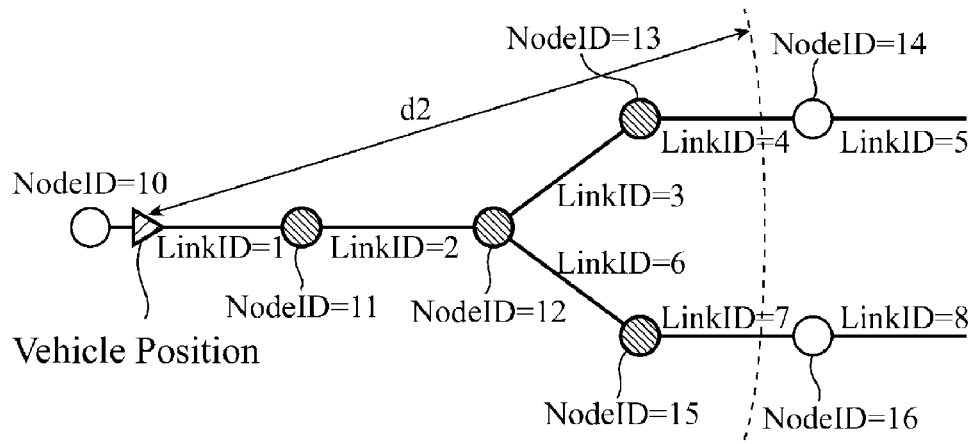
FIG.7
(a)
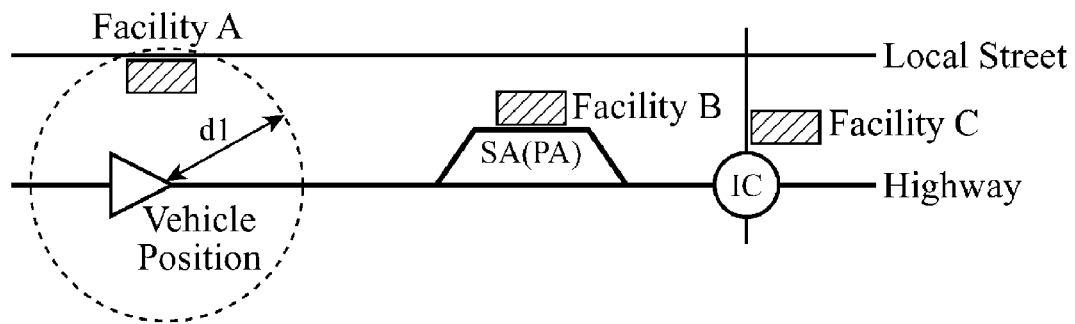
(b)
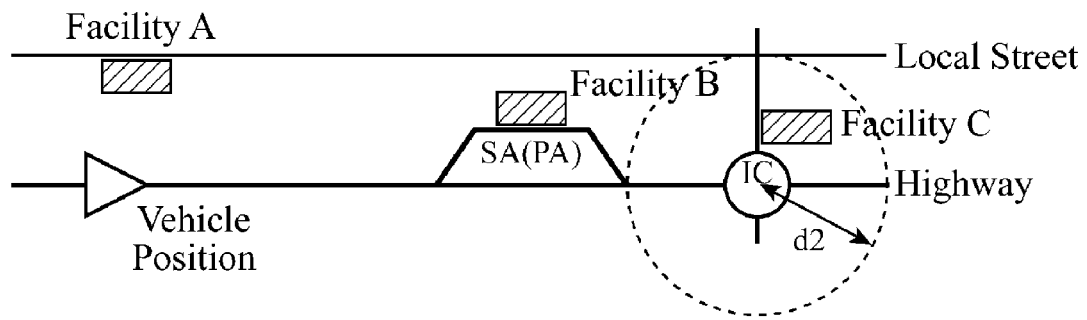

FIG.8
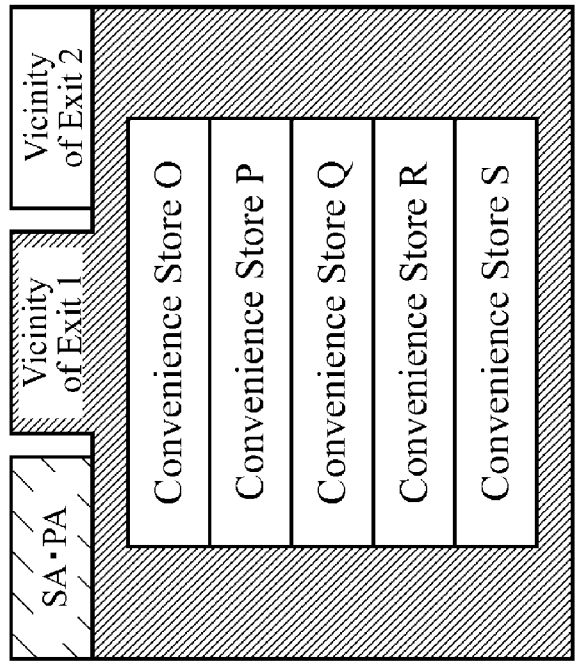
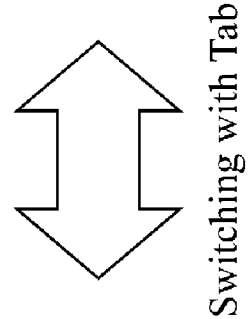
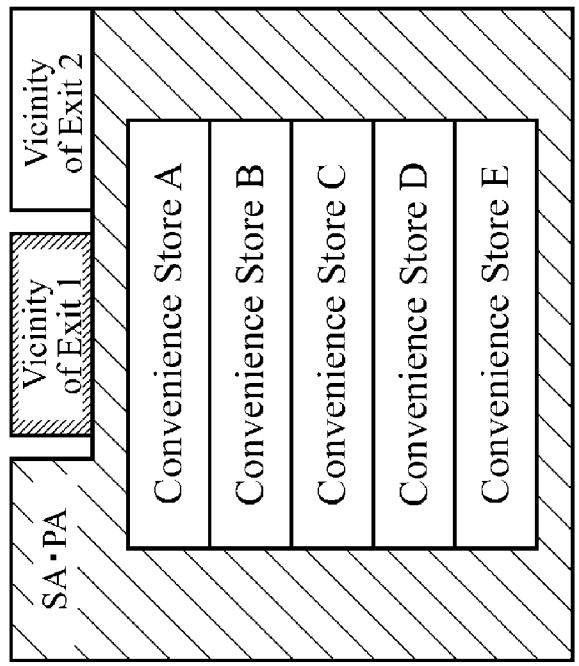

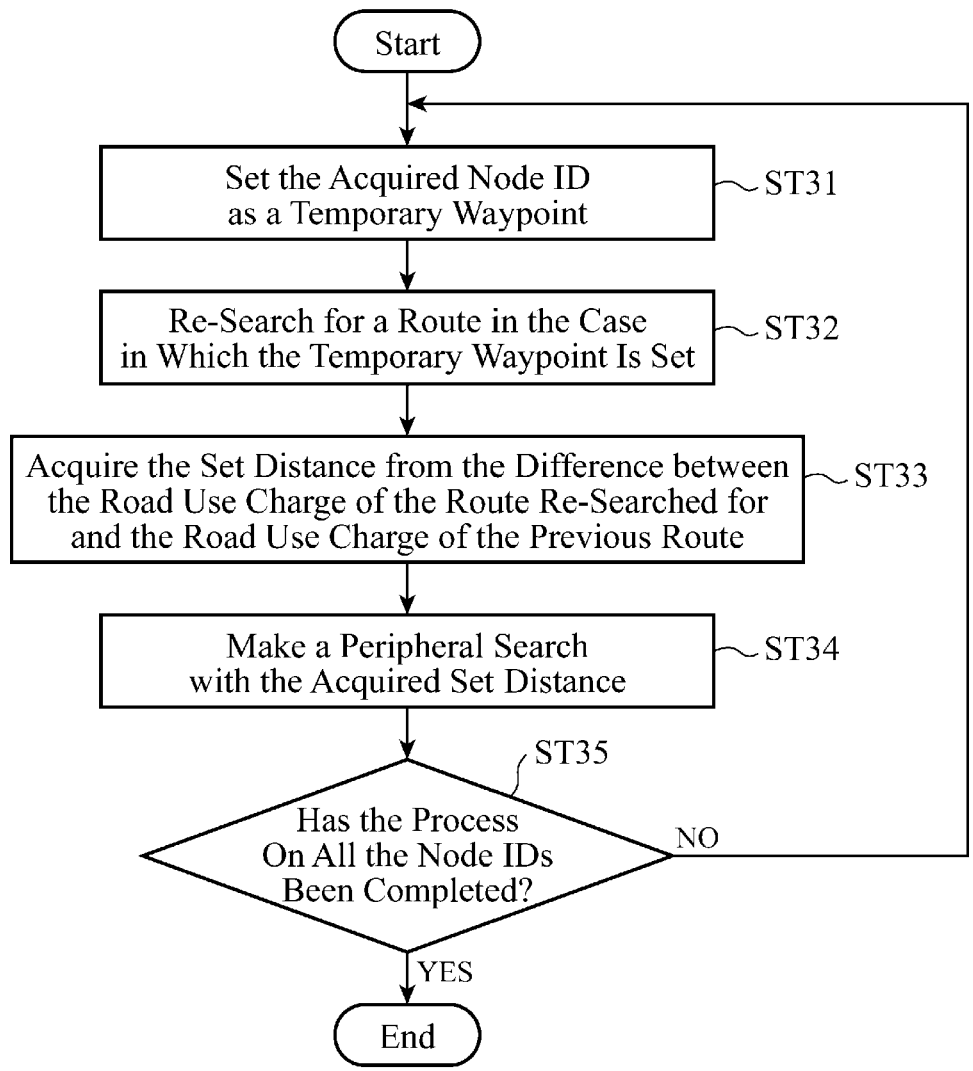

FIG.11

(a) Family Restaurant

| Increased Cost | Set Distance |
|---|---|
| 500 Yen or Less | 2km |
| 500 to 1000 Yen | 1km |
| ... | ... |
| 10000 Yen or More | 0m |

(b) Gas Station

| Increased Cost | Set Distance |
|---|---|
| 500 Yen or Less | 5km |
| 500 to 1000 Yen | 3km |
| ... | ... |
| 10000 Yen or More | 500m |

(c) Convenience Store

| Increased Cost | Set Distance |
|---|---|
| 500 Yen or Less | 500m |
| 500 to 1000 Yen | 0m |
| ... | ... |
| 10000 Yen or More | 0m |

NAVIGATION DEVICE

FIELD OF THE INVENTION

The present invention relates to a navigation device that provides a user with guidance information. More particularly, it relates to a technology of searching for facilities in an area surrounding the vehicle position.

BACKGROUND OF THE INVENTION

Generally, a navigation device has a surrounding facility searching function of searching for facilities in an area surrounding the vehicle position (the current position). This surrounding facility searching function is the one of searching for facilities which meet a search condition specified by the user, and which exist in an area surrounding the vehicle position and located at a predetermined distance or less from the vehicle position from a map database, though a problem is that when the vehicle position is on a road, such as a highway, which vehicles can enter and exit only via entrances and exits for exclusive use (referred to as a "dedicated road" from here on), the surrounding facility searching function may present a facility which is close to the vehicle position with respect to distance, but is far from the vehicle position with respect to time, such a facility which the vehicle cannot reach unless it exits the dedicated road from an exit of the dedicated road, to the user.

In order to solve this problem, patent reference 1 discloses a car navigation device that has a surrounding facility searching function and that can use the surrounding facility searching function effectively even in a case in which the vehicle is traveling along a dedicated road. In this car navigation device, when carrying out a surrounding facility search, a control circuit causes the user to specify a search condition for searching for facilities, and searches for (extracts) facilities meeting the search condition and existing within a predetermined search area surrounding the vehicle position (e.g., within an area having a radius of 10 km), lists them to display them on a display unit, and displays them using landmarks on a road map. At this time, the control circuit determines whether the current position of the vehicle is on a local street or a dedicated road, and, when the current position of the vehicle is on a dedicated road, sets an area surrounding an exit of the dedicated road as the search area in which surrounding facilities are to be searched for. When there are two or more exits, the control circuit causes the user to select the next exit or one of the other exits. Furthermore, during route guidance, the control circuit causes the user to select the next exit or an exit of the dedicated road on the guidance route.

RELATED ART DOCUMENTS

Patent References

[Patent reference 1] JP, 2004-170233, A

A problem with the car navigation device disclosed by above-mentioned patent reference 1 is, however, that when, for example, any facilities meeting the search condition specified by the user do not exist in the vicinity of the next exit or the exit specified by the user, the car navigation device fails in the searching, that is, and the car navigation device enters a state in which "any facilities are not found", and cannot achieve the search objective.

Furthermore, in order to search for a facility which is the closest to the vehicle with respect to time, the conventional car navigation device needs to perform a route search process by setting each facility on the map database as a destination, and select a facility which minimizes the route which is searched for. However, a huge amount of computation is required to carry out the route search process, and it is impracticable to implement this route search process.

The present invention is made in order to solve the above-mentioned problems, and it is therefore an object of the present invention to provide a navigation device that can ideally search for facilities which a user desires in a short time to present them to the user even if the vehicle is travelling along a dedicated road.

SUMMARY OF THE INVENTION

In order to solve the above-mentioned problems, a navigation device in accordance with the present invention includes: a map information acquiring unit for acquiring map information; a positioning unit for measuring a vehicle position; a route determining unit for determining a route from a place of departure to a destination; an input unit for inputting a condition for a search for facilities which are search objects; a facility searching unit for, when the vehicle position measured by the positioning unit is located on a dedicated road whose exits and entrances are predetermined, searching through the map information acquired by the map information acquiring unit for facilities existing on the dedicated road and facilities existing at a predetermined distance or less from an exit of the dedicated road, those facilities satisfying the search condition inputted from the input unit; and a display unit for displaying the facilities searched for by the facility searching unit in order of increasing distance from the vehicle position measured by the positioning unit, wherein the above-mentioned facility searching unit changes the predetermined distance from the exit of the above-mentioned dedicated road according to both the vehicle position measured by the above-mentioned positioning unit and a setting state of the route determined by the above-mentioned route determining unit to carry out the search.

Because the navigation device in accordance with the present invention is configured in such a way as to search for facilities existing on the dedicated road where the vehicle position is located, e.g., facilities in service areas or parking areas, and facilities in the vicinity of an exit of the dedicated road, the navigation device in accordance with the present invention can search for facilities which are the closest to the vehicle position with respect to time at a high speed without failing in the search.

BRIEF DESCRIPTION OF THE FIGURES

FIG. 6 is a view for explaining the facility searching process carried out by the navigation device in accordance with Embodiment 1 of the present invention;

FIG. 7 is a view showing a comparison of facilities which are searched for in the facility searching process by the navigation device in accordance with Embodiment 1 of the present invention with the conventional facility search;

FIG. 8 is a view showing a display example of the facility search results displayed by the navigation device in accordance with Embodiment 1 of the present invention;

FIG. 9 is a flow chart showing a process of acquiring facilities at a predetermined distance from a node ID in the facility searching process carried out by a navigation device in accordance with Embodiment 2 of the present invention;

FIG. 10 is a view showing an example of a setting table for use in the navigation device in accordance with Embodiment 2 of the present invention;

FIG. 10 is a view showing another example of the setting table for use in the navigation device in accordance with Embodiment 2 of the present invention;

EMBODIMENTS OF THE INVENTION

Hereafter, in order to explain this invention in greater detail, the preferred embodiments of the present invention will be described with reference to the accompanying drawings.

Embodiment 1

Figure 1:
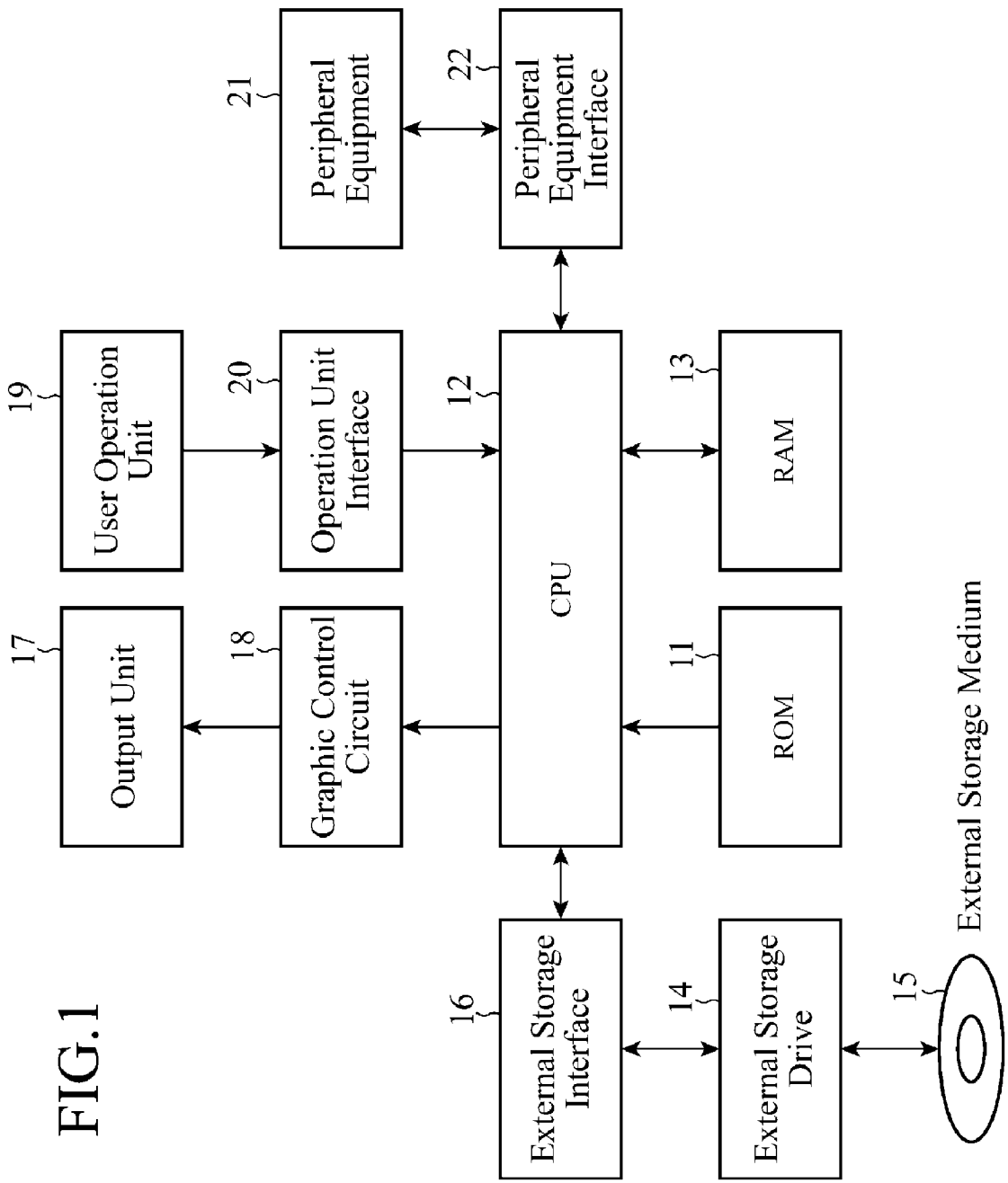
FIG. 1 is a block diagram showing the hardware configuration of a navigation device in accordance with Embodiment 1 of the present invention.

FIG. 1 is a block diagram showing the hardware configuration of a navigation device in accordance with Embodiment 1 of the present invention. This navigation device is provided with a ROM 11, a CPU 12, a RAM 13, an external storage drive 14, an external storage medium 15, an external storage interface 16, an output unit 17, a graphic control circuit 18, a user operation unit 19, an operation unit interface 20, peripheral equipment 21, and a peripheral equipment interface 22.

The ROM 11 stores a navigation program, a facility searching program, and so on. The contents of this ROM 11 can be read by the CPU 12. The CPU 12 performs a navigation process or a facility searching process according to the navigation program or the facility searching program read from the ROM 11. The RAM 13 is comprised of, for example, a volatile memory. This RAM 13 is subjected to writing and reading by the CPU 12. When the CPU executes the navigation program, the facility searching program, and so on, the RAM temporarily stores data used by these programs.

The external storage drive 14 is comprised of, for example, a DVD (Digital Versatile Disc) drive, a CD (Compact Disk) drive, or an HDD (Hard Disk Drive), and reads data from the external storage medium 15 and sends the data to the external storage interface 16. The external storage medium 15 is comprised of, for example, a DVD-ROM, a CD-ROM, a hard disk included in an HDD, or the like, and stores a map database or a facility database. The external storage interface 16 controls transmission and reception of data which are carried out between the CPU 12 and the external storage drive 14.

The output unit 17 is comprised of, for example, an LCD (Liquid Crystal Display) device, and displays an image according to an image signal sent thereto from the graphic control circuit 18. The graphic control circuit 18 creates the image signal for drawing the image according to display data sent thereto from the CPU 12, and sends the image signal to the output unit 17.

The user operation unit 19 is comprised of input buttons disposed on a main body panel arranged on, for example, a front surface of the navigation device, a remote controller (remote control), a touch panel placed on the screen of the LCD device, a microphone for voice input with which the user is allowed to perform an operation by voice, or a combination of some of these components. An operation signal generated through the user's operation on this user operation unit 19 is sent to the operation unit interface 20. The operation unit interface 20 sends the operation signal sent thereto from the user operation unit 19 to the CPU 12 as operation data.

The peripheral equipment 21 is comprised of, for example, a GPS (Global Positioning System) receiver, a gyro, a speed sensor, a speaker (these components are not shown in the figure), and so on. Transmission and reception of data between this peripheral equipment 21 and the CPU 12 are carried out via the peripheral equipment interface 22. The peripheral equipment interface 22 controls transmission and reception of data between the peripheral equipment 21 and the CPU 12.

Figure 2:
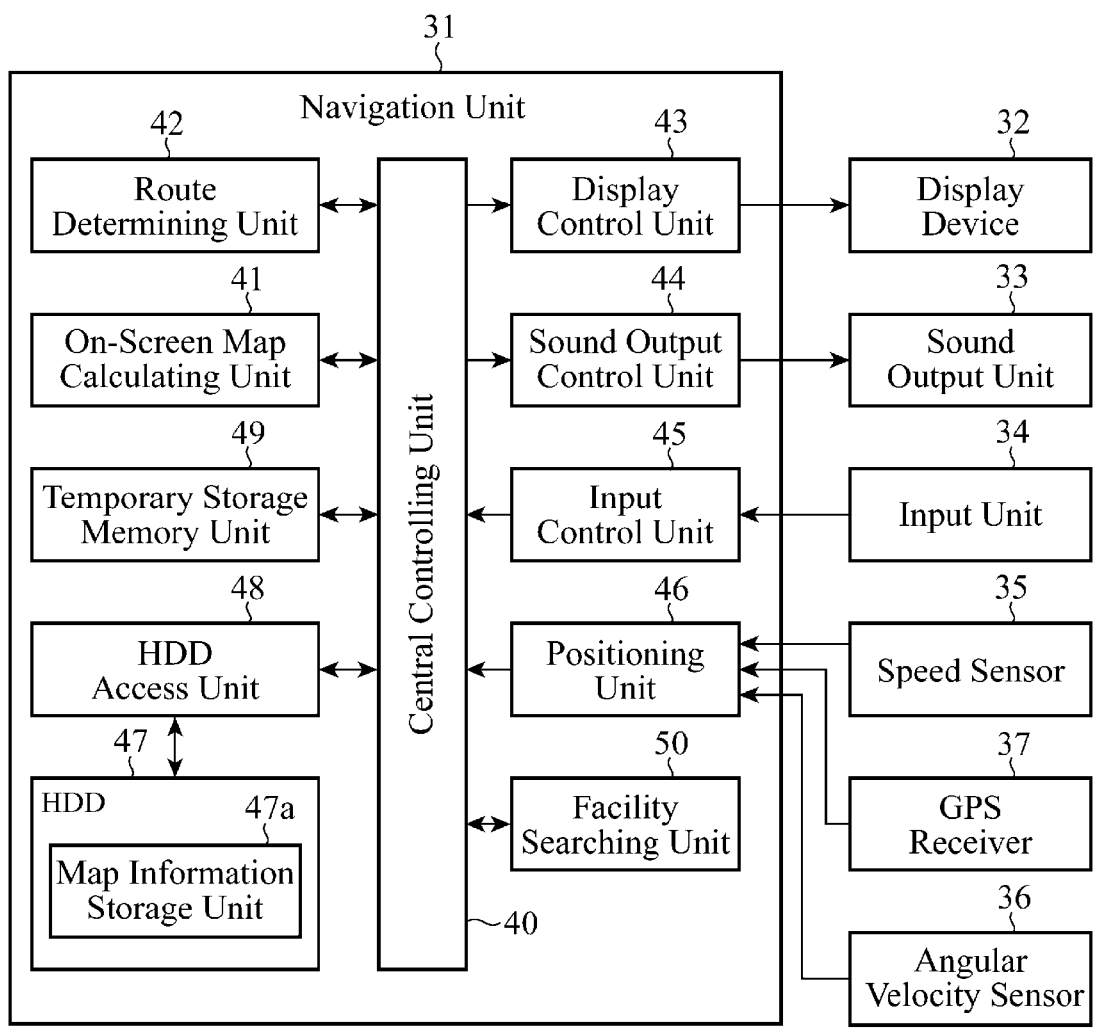
FIG. 2 is a block diagram showing the functional configuration of the navigation device in accordance with Embodiment 1 of the present invention.

FIG. 2 is a block diagram showing the functional configuration of the navigation device in accordance with Embodiment 1 of the present invention. This navigation device is comprised of a display unit 32 connected to a navigation unit 31, a sound output unit 33, an input device (input unit) 34, a speed sensor 35, an angular velocity sensor 36, and a GPS receiver 37.

The navigation unit 31 controls the whole navigation device. For example, the navigation unit performs the navigation process of implementing the navigation function, the facility searching process of implementing the facility searching function, and so on. The details of this navigation unit 31 will be mentioned below.

The display unit (display unit) 32 is comprised of the output unit 17 and the graphic control circuit 18 which are shown in FIG. 1, and displays a map image, a recommended route, facility search results, and so on according to display data sent thereto from the navigation unit 31.

The sound output unit 33 is comprised of the speaker and the peripheral equipment interface 22 which are included in the peripheral equipment 21 shown in FIG. 1, and outputs a guide message for guiding the user along the recommended route leading to a destination, various messages included in map information, and so on by voice according to sound data sent thereto from the navigation unit 31.

The input unit 34 is comprised of the user operation unit 19 and the operation unit interface 20 which are shown in FIG. 1, and inputs a map area to be displayed on the display unit 32, or a place of departure, waypoints, the destination, and so on required to determine the recommended route. The map area, the place of departure, the waypoints, the destination, and so on which are inputted from this input unit 34 are informed to the navigation unit 31 as operation data.

The speed sensor 35 is comprised of the speed sensor and the peripheral equipment interface 22 which are included in the peripheral equipment 21 shown in FIG. 1, and detects the traveling speed of the vehicle. The traveling speed detected by this speed sensor 35 is informed to the navigation unit 31 as vehicle speed data.

The angular velocity sensor 36 is comprised of the gyro and the peripheral equipment interface 22 which are included in the peripheral equipment 21 shown in FIG. 1, and detects the traveling direction of the vehicle. The traveling direction of the vehicle detected by this angular velocity sensor 36 is informed to the navigation unit 31 as traveling direction data.

The GPS receiver 37 is comprised of the GPS receiver and the peripheral equipment interface 22 which are included in the peripheral equipment 21 shown in FIG. 1, receives radio waves sent thereto from GPS satellites, and detects the current position of the vehicle. The current position of the vehicle detected by this GPS receiver 37 is informed to the navigation unit 31 as current position data.

Next, the details of the navigation unit 31 will be explained. The navigation unit 31 is comprised of a central controlling unit 40, an on-screen map calculating unit 41, a route determining unit 42, a display control unit 43, a sound output control unit 44, an input control unit 45, a positioning unit 46, an HDD (Hard Disk Drive) 47, an HDD access unit 48, a temporary storage memory unit 49, and a facility searching unit 50. These components except the HDD 47 and the temporary storage memory unit 49 are implemented via software processed by the CPU 12.

According to a procedure programmed beforehand, the central controlling unit 40 controls start and stop of the on-screen map calculating unit 41, the route determining unit 42, the display control unit 43, the sound output control unit 44, the input control unit 45, the positioning unit 46, the HDD access unit 48, the temporary storage memory unit 49, and the facility searching unit 50, and controls transmission and reception of data among these components. Hereafter, in order to prevent the explanation from becoming complicated, descriptions about transmission and reception of data among the above-mentioned components being carried out via the central controlling unit 40 will be omitted.

The on-screen map calculating unit 41 creates a map image for display from map information sent thereto via the HDD access unit 48 from the map information storage unit 47a (the details of this unit will be mentioned below) of the HDD 47. Data showing the map image created by this on-screen map calculating unit 41 are sent to the display control unit 43.

The route determining unit 42 determines the recommended route leading from the place of departure shown by either the data showing the place of departure sent thereto from the input control unit 45 or the vehicle position data showing the current position (the place of departure) of the vehicle sent thereto from the positioning unit 46 to the destination shown by the data showing the destination sent thereto from the input control unit 45 on the basis of the map information read from the map information storage unit 47a of the HDD 47 via the HDD access unit 48. Data showing the recommended route determined by this route determining unit 42 are sent to the display control unit 43.

The display control unit 43 converts the data showing the map image sent thereto from the on-screen map calculating unit 41, the data showing the recommended route sent thereto from the route determining unit 42, the data showing the search results sent thereto from the facility searching unit 50, and so on into display data in the form in which the display data can be displayed on the display unit 32, and sends the display data to this display unit 32. As a result, the map, the recommended route, the results of the facility search, and so on are displayed on the display unit 32. A display unit in accordance with the present invention is comprised of this display control unit 43 and the above-mentioned display unit 32.

The sound output control unit 44 converts a voice message for guiding the driver to the destination along the route, which is shown by the data showing the recommended route sent thereto from the route determining unit 42, and a voice message for notifying information included in the map information, and so on to the driver into sound data in the form in which the sound output unit 33 can output the sound data, and sends the sound data to this sound output unit 33. As a result, a message via voice is outputted from the sound output unit 33.

The input control unit 45 receives operation data sent thereto from the input unit 34, and sends the operation data to the on-screen map calculating unit 41, the route determining unit 42, the facility searching unit 50, and so on. Concretely, when the operation data show a map area, the operation data are sent to the on-screen map calculating unit 41, when the operation data show the place of departure, the waypoints, or the destination, the operation data are sent to the route determining unit 42, and when the operation data show the search condition for searching for facilities, e.g., a genre, a region (a prefecture), or the amount of money spent in a facility, the operation data are sent to the facility searching unit 50. An input unit in accordance with the present invention is comprised of this input control unit 45 and the above-mentioned input unit 34.

The positioning unit 46 detects the current position of the vehicle on the basis of the vehicle speed data sent thereto from the speed sensor 35, the traveling direction data sent thereto from the angular velocity sensor 36, and the current position data sent thereto from the GPS receiver 37, compares this detected current position of the vehicle with road information included in the map information stored in the HDD 47, and determines which position on which one of the roads shown by the road information corresponds to the current position of the vehicle. The position determined by this positioning unit 46 is informed to the on-screen map calculating unit 41, the route determining unit 42, and the facility searching unit 50 as vehicle position data.

The HDD 47 is comprised of the external storage drive 14, the external storage medium 15, and the external storage interface 16, which are shown in FIG. 1, and includes the map information storage unit 47a for storing the map information. The map information including the road information and facility information is stored in the map information storage unit 47a in a form in which the map information is divided into a plurality of meshes. A mesh ID is given to each of the meshes, and road information and facility information are tied to this mesh ID. Furthermore, the road information is expressed in the form of a graph structure having links and nodes, and a link ID is given to each of the links and a node ID is given to each of the nodes.

The HDD access unit 48 controls writing of data into the HDD 47 and reading of data from the HDD 47 according to a command from the central controlling unit 40. A map information acquiring unit in accordance with the present invention is comprised of the HDD 47 and the HDD access unit 48.

The temporary storage memory unit 49 is comprised of the RAM 13 shown in FIG. 1, and is used in order to store various pieces of information temporarily. When performing a process by using the road information included in the map information stored in the HDD 47, each component connected to the central controlling unit 40 reads map information about a map area corresponding to a mesh used in the process from the HDD 47 via the HDD access unit 48, and stores this read information in the temporary storage memory unit 49 to use this information.

Next, the operation of the navigation device in accordance with Embodiment 1 of the present invention configured as mentioned above will be explained. First, in order to facilitate the understanding of the operation of the navigation device in accordance with this Embodiment 1, a facility searching process for implementing a conventional surrounding facility searching function will be explained.

Figure 3:
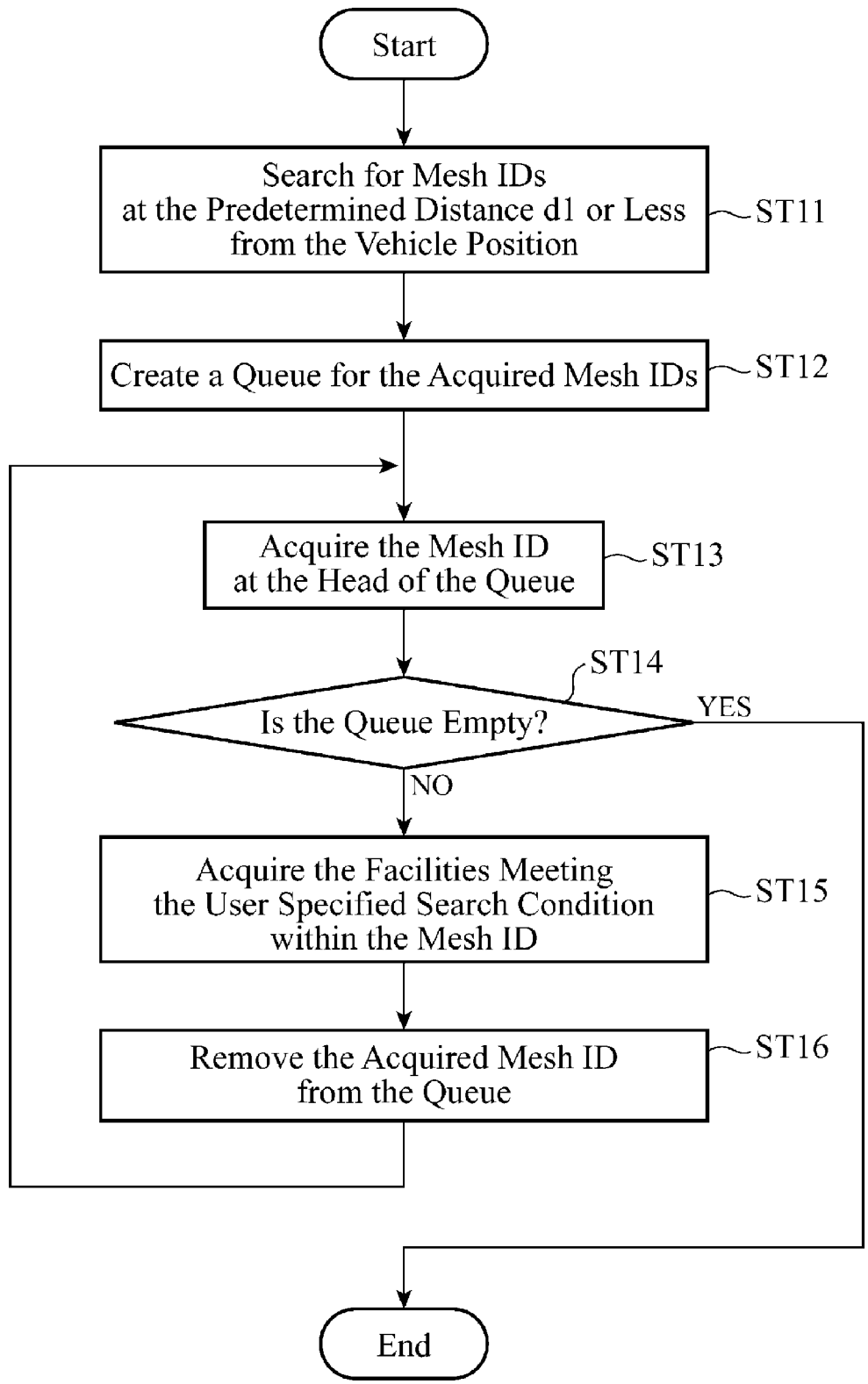
FIG. 3 is a flow chart showing a facility searching process for implementing a conventional surrounding facility searching function.

FIG. 3 is a flow chart showing the facility searching process for implementing the conventional surrounding facility searching function. It is assumed that prior to the time of performing this facility searching process, a condition for searching for facilities which are search objects is inputted by the user using the input unit 34, and the condition for searching for facilities is set to the temporary storage memory unit 49 via the input control unit 45.

Figure 4:
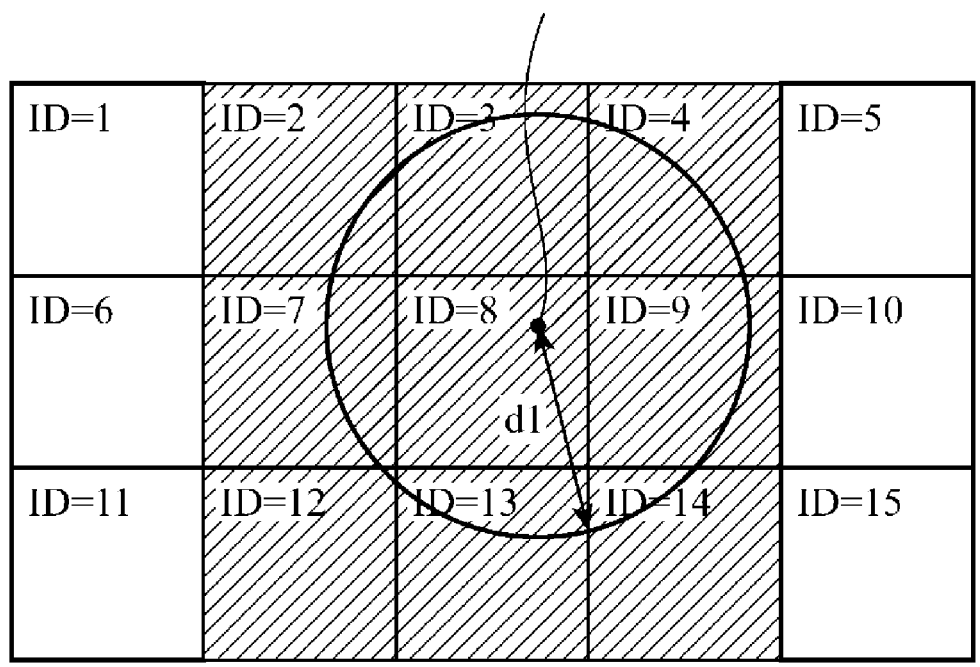
FIG. 4 is a view for explaining an operation of acquiring a mesh existing at a predetermined distance or less from a vehicle position which is carried out in the facility searching process for implementing the conventional surrounding facility searching function.

In the facility searching process, the mesh IDs given to the meshes located within the area at a predetermined distance d1 or less from the vehicle position is retrieved first (step ST11). More specifically, the facility searching unit 50 searches through the map information stored in the map information storage unit 47a of the HDD 47 via the HDD access unit 48 so as to acquire the mesh IDs given to the meshes located within the area at the distance d1 or less from the vehicle position shown by the vehicle position data acquired from the positioning unit 46, as shown in FIG. 4. In the example shown in FIG. 4, "IDs=2, 3, 4, 7, 8, 9, 12, 13 and 14" are acquired as the mesh IDs.

A queue of the acquired mesh IDs is then created (step ST12). More specifically, the facility searching unit 50 stores the mesh IDs acquired in step ST11 in a queue. The queue is formed in the temporary storage memory unit 49. A mesh ID at the head of the queue is then acquired (step ST13). More specifically, the facility searching unit 50 acquires the mesh ID at the head of the queue. In other words, the facility searching unit 50 extracts one mesh ID from the head of the queue.

Whether or not the queue is empty is then checked to see (step ST14). More specifically, the facility searching unit 50 checks to see whether or not the queue has become empty as the result of extracting the mesh ID at the head of the queue in step ST13. When, in this step ST14, determining that the queue is empty, the facility searching unit recognizes that the process on all the mesh IDs has been completed, and then ends the facility searching process.

In contrast, when, in step ST14, determining that the queue is not empty, the facilities meeting the user-specified search condition within the mesh of the mesh ID are then acquired (step ST15). More specifically, the facility searching unit 50 refers to the facility information which is tied to the mesh ID acquired in step ST13 and which is stored in the map information storage unit 47a (in detail, tree structure data for facility search which are called a search data frame), and then acquires the facility information meeting the search condition which is stored in the temporary storage memory unit 49 from the facility information tied to the mesh shown by the mesh ID.

The acquired mesh ID is then removed from the queue (step ST16). More specifically, the facility searching unit 50 removes the mesh ID at the head of the queue. As a result, the next mesh ID is set to the head of the queue. After that, the navigation device returns the sequence to step ST13 and then repeats the above-mentioned processing. Through the above-mentioned processing, the pieces of facility information about the facilities located within the area at the distance d1 or less from the vehicle position are acquired.

Next, the facility searching process for implementing the surrounding facility searching function in the navigation device in accordance with Embodiment 1 of the present invention will be explained with reference to a flow chart shown in FIG. 5 and an explanatory drawing shown in FIG. 6. It is assumed that prior to the time of performing this facility searching process, a condition for searching for facilities which are search objects is inputted by the user using the input unit 34, and the condition for searching for facilities is set to the temporary storage memory unit 49 via the input control unit 45.

In the facility searching process, whether or not the vehicle position is on a dedicated road is checked to see first (step ST21). More specifically, the facility searching unit 50 checks to see whether the vehicle position shown by the vehicle position data sent thereto from the positioning unit 46 is on a dedicated road shown by the road information included in the map information which is read from the map information storage unit 47a of the HDD 47 via the HDD access unit 48.

When it is determined, in this step ST21, that the vehicle position is not on a dedicated road, the conventional facility searching process is performed (step ST22). More specifically, the facility searching unit 50 performs the facility searching process which is explained with reference to the flow chart of FIG. 3. Then, the navigation device ends the facility searching process.

In contrast, when it is determined, in step ST21, that the vehicle position is on a dedicated road, the IDs of the links and the nodes located within an area at a distance d2 or less from the vehicle position are then acquired (step ST23). More specifically, the facility searching unit 50 acquires the link IDs given to the links and the node IDs given to the nodes which are located within the area at the distance d2 or less from the vehicle position shown by the vehicle position data sent thereto from the positioning unit 46, as shown in, for example, FIG. 6, from among the links and the nodes which construct the road information included in the map information which is read from the map information storage unit 47a of the HDD 47 via the HDD access unit 48. In the example shown in FIG. 6, "Link IDs=1, 2, 3, 4, 6, and 7" are acquired as the link IDs, and "Node IDs=11, 12, 13, and 15" are acquired as the node IDs.

The facilities associated with the links of the acquired link IDs and meeting the user specified search condition are then acquired (step ST24). More specifically, the facility searching unit 50 acquires the pieces of information about the facilities located on the dedicated road formed by the links shown by the link IDs acquired in step ST23, concretely, the pieces of information about the facilities located in service areas (SA) or parking areas (PA) attached and disposed in the dedicated road from the facility information included in the map information which is read from the map information storage unit 47a of the HDD 47 via the HDD access unit 48.

The facilities located at a distance d3 or less from each of the acquired node IDs and meeting the user specified search condition are then acquired (step ST25). More specifically, the facility searching unit 50 acquires the pieces of facility information about the facilities located at the distance d3 or less from the point shown by each of the node IDs acquired in step ST23. The process of this step ST25 can be implemented by replacing the vehicle position with the point shown by each of the node IDs and then replacing the distance d1 with the distance d3 in the conventional facility searching process shown in the above-mentioned flow chart of FIG. 3.

The results of the facility searches are then merged (step ST26). More specifically, the facility searching unit 50 merges the pieces of facility information acquired in step ST24 and the pieces of facility information acquired in step ST25 into pieces of facility information, and sends these pieces of facility information to the display control unit 43. The display control unit 43 sorts the pieces of facility information received from the facility searching unit 50 in order of increasing distance from the vehicle position, and sends the sorted pieces of facility information to the display unit 32. As a result, the facilities searched for are displayed on the display unit 32 in order of increasing distance from the vehicle position. The display control unit 43 can be alternatively configured in such a way as to sort the pieces of facility information received from the facility searching unit 50 in Japanese syllabary order (in alphabetical order), and send the sorted pieces of facility information to the display unit 32. As a result, the facilities searched for are displayed on the display unit 32 in Japanese syllabary order. For example, in a case in which the facilities searched for are convenience stores, they are displayed in Japanese syllabary order of brand names of convenience stores. In this case, the distance from the vehicle position to each of the facilities can be simultaneously displayed as well as its brand name. After that, the navigation device ends the facility searching process.

As explained above, the navigation device in accordance with Embodiment 1 of the present invention provides the following advantages. FIG. 7(a) shows a facility which can be searched for through the conventional facility searching process which is shown in the above-mentioned flow chart of FIG. 3. When carrying out a facility search by setting a distance d1 as a search range in a state in which the vehicle position is on a highway which is a dedicated road, the navigation device can find out a facility A existing on a local street outside the highway, but cannot find out a facility B existing in a service area (SA) or a parking area (PA) on the highway, and a facility C existing in the vicinity of an interchange (IC). It is thus irrational that the navigation device presents the facility A which is the furthermost from the vehicle with respect to time to the user as search results, but does not present the facilities B and C which are nearer from the vehicle with respect to time to the user.

Figure 5:
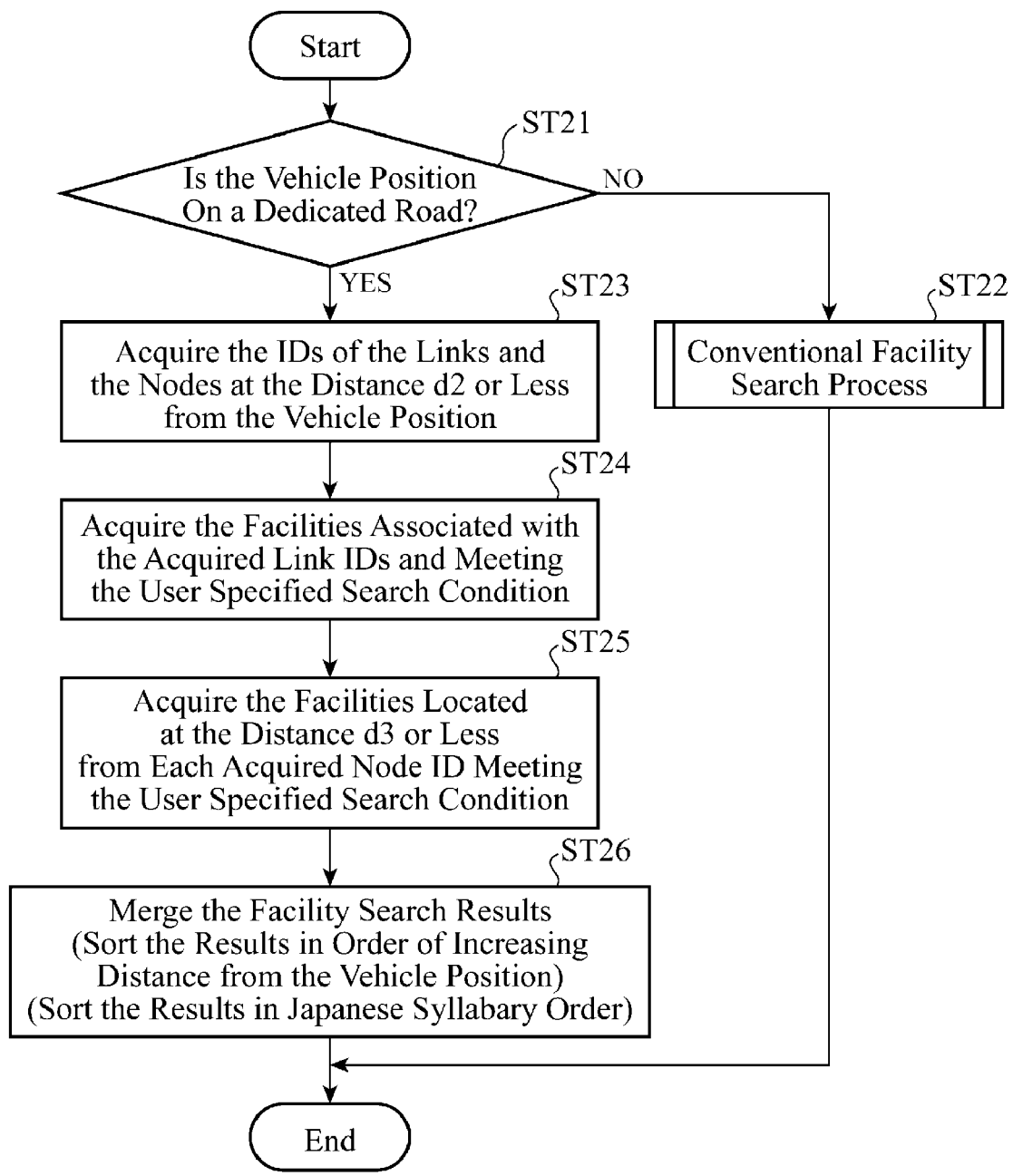
FIG. 5 is a flow chart showing a facility searching process carried out by the navigation device in accordance with Embodiment 1 of the present invention.

In contrast with this, FIG. 7(b) shows facilities which can be searched for through the facility searching process carried out by the navigation device in accordance with Embodiment 1 which is shown in the above-mentioned flow chart of FIG. 5. In this case, the navigation device can find out the facility B existing on the highway on which the vehicle position is located and the facility C existing at a distance d2 from the interchange (IC), but cannot find out the facility A which is located outside the highway and existing at a position at a distance longer than the distance d2 from the interchange (IC). Therefore, the navigation device can provide the user with the pieces of information about the facilities which are the nearest to the user with respect to time.

In the facility searching process which is carried out by the navigation device in accordance with above-mentioned Embodiment 1, a search for facilities in an area surrounding a node shown by each node ID is configured in such a way as to include the step of referring to pieces of facility information about facilities which are stored while being tied to each mesh ID by using the conventional facility searching process, and the step of, from these pieces of facility information, acquiring pieces of facility information about facilities meeting the search condition stored in the temporary storage memory unit 49. As an alternative, the search can be configured in such a way as to include the step of including pieces of facility information tied to each node ID in the map information to store this map information in advance, and the step of acquiring the pieces of facility information meeting the search condition from this stored map information. According to this configuration, there is provided an advantage of being able to reduce the time required to carry out the facility searching process. In this case, although the size of the map information increases, because in recent years HDDs having a large capacity have been provided at a low cost, this increase in the size of the map information presents no problem.

Furthermore, in the facility searching process which is carried out by the navigation device in accordance with above-mentioned Embodiment 1, it is assumed that all the links which are a target to be processed are the links of a dedicated road. As an alternative, the navigation device can be configured in such a way as to extract only the links of a dedicated road with filtering after acquiring all the links in an area surrounding the vehicle position.

In addition, in the facility searching process which is carried out by the navigation device in accordance with above-mentioned Embodiment 1, a fixed distance d3 is set as the search range in the case of searching for facilities in an area surrounding the point shown by each node ID. As an alternative, the navigation device can be configured in such a way as to change the distance d3 according to the search condition specified by the user. For example, in a case in which the search condition is a search for convenience stores, the navigation device sets a distance d4 as the search range, and, in a case in which the search condition is a search for gas stations, the navigation device sets a distance d5 (d4<d5). When searching for gas stations under this condition, even if a gas station, which has a higher priority in the search, is a little away from the vicinity of an exit, the navigation device can include the gas station in the search range.

As an alternative, the navigation device can be configured in such a way as to change the distance d3 according to the distance from the vehicle position to the point shown by each node ID. For example, by increasing the distance d3 as the distance from the vehicle position to the point shown by each node ID decreases, the navigation device can search for facilities in a wider range in the vicinity of an exit which is closer to the vehicle position, and search for facilities in a narrower range in the vicinity of another exit which is far away from the vehicle position, i.e., which the vehicle has a little chance of reaching. Furthermore, by setting the distance d3 to zero, the navigation device can also disable itself to make any search for facilities. Furthermore, although the amount of computations required for the facility search increases as the distance d2 increases, the navigation device can make a search for facilities in a wide region.

Furthermore, in the facility searching process which is carried out by the navigation device in accordance with above-mentioned Embodiment 1, the results of merging pieces of facility information are displayed in order of increasing distance from the vehicle position, in Japanese syllabary order (in alphabetical order), or in Japanese syllabary order of brand names, such as convenience store names, like in the case of display of general facility search results. As an alternative, facilities on a dedicated road (e.g., an SA tab and a PA tab) and facilities in the vicinity of an exit of the dedicated road (a tab in the vicinity of an exit 1 and a tab in the vicinity of an exit 2) can be distinguished and displayed, as shown in, for example, FIG. 8.

In addition, the navigation device can be configured in such a way as to display an icon showing whether each searched facility is a facility existing in the vicinity of an exit or a facility existing on the dedicated road before the name of each facility. According to this configuration, the user can easily distinguish whether each searched facility exists in the vicinity of an exit or on the dedicated road.

Embodiment 2

The navigation device in accordance with above-mentioned Embodiment 1 is configured in such a way as to carry out a search for facilities in an area surrounding the current position in a state in which any recommended route is not set. In contrast, a navigation device in accordance with this Embodiment 2 is configured in such a way as to carry out a search for facilities in an area surrounding the current position in a state in which a recommended route is set.

The hardware configuration and functional configuration of the navigation device in accordance with Embodiment 2 of the present invention are the same as those of the navigation device in accordance with Embodiment 1 shown in FIGS. 1 and 2 respectively.

Next, the operation of the navigation device in accordance with Embodiment 2 of the present invention will be explained. A facility searching process carried out by this navigation device is configured in such a way that the process of step ST23 in the flow chart of the facility searching process carried out by the navigation device in accordance with Embodiment 1 shown in FIG. 5 is changed as follows.

That is, in step ST23, the IDs of links and nodes of the recommended route which are located within an area at a distance d2 or less from the vehicle position are then acquired. More specifically, a facility searching unit 50 acquires the link IDs given to the links and the node IDs given to the nodes which are located within the area at the distance d2 or less from the vehicle position shown by vehicle position data sent thereto from a positioning unit 46 from among the links and the nodes which construct the recommended route shown by data sent thereto from a route determining unit 42. Subsequent steps are the same as those of the facility searching process carried out by the navigation device in accordance with Embodiment 1.

Because the navigation device in accordance with this Embodiment 2 carries out a search for facilities while targeting only each dedicated road which constructs the recommended route and the vicinity of each exit of each dedicated road, but not targeting a dedicated road extending outside the recommended route and branching off from a dedicated road which constructs the recommended route, and the vicinity of each exit of the dedicated road extending outside the recommended route, the navigation device can narrow the search range. As a result, the navigation device can reduce the time required to carry out the facility search and can present only facilities where the user can make a stop to the user.

In the case in which the recommended route is set, because an exit from an exit of a dedicated road to a local street results in the occurrence of a high cost (expense and time), a distance d3 from the point shown by each node ID which defines the region in which a search for facilities is to be made can be set to be shorter than the one set in the case in where the recommended route is not set.

Furthermore, the navigation device in accordance with Embodiment 1 can be configured in such a way as to change the distance d3 according to the distance from the destination to an exit of the dedicated road, like in the case in which the navigation device changes the distance d3 according to the distance from the vehicle position to an exit of the dedicated road.

In addition, the navigation device can be configured in such a way as to change the distance d3 in consideration of the cost which occurs when the vehicle exits from an exit of the dedicated road to a local street. In this case, the process done in step ST25 of the flow chart of the facility searching process which is carried out by the navigation device in accordance with Embodiment 1 shown in FIG. 5, i.e., the process of acquiring facilities meeting a user specified search condition and located at the distance d3 or less from an acquired node ID is changed as shown in a flow chart of FIG. 9.

In this process, the acquired node ID is set as a temporary waypoint first (step ST31). More specifically, the facility search unit 50 sets the point shown by the node ID acquired in step ST23 (a location where the vehicle has reached immediately after going out of an exit of the dedicated road) as a temporary waypoint. Because this temporary waypoint is not an actual waypoint, the temporary waypoint is not presented to the user.

The navigation device then re-searches for a route in the case in which the temporary waypoint is set (step ST32). More specifically, the route determining unit 42 determines a route leading from the place of departure to the destination via the temporary waypoint set in step ST31 on the basis of the map information again. The route acquired through this re-search is also not presented to the user.

A set distance is then acquired from the difference between the road use charge of the route, which has been re-searched for, and the road use charge of the previous route (step ST33). More specifically, the facility searching unit 50 refers to a setting table in which a relationship between the cost increase and the set distance (the distance from the exit of the dedicated road), as shown in FIG. 10, is stored in advance so as to acquire the difference between the road use charge of the dedicated road in the case of travelling along the route acquired through the re-search, and the road use charge of the dedicated road in the case of travelling along the previous route determined before the re-search has been made, i.e., the set distance corresponding to the cost increase.

A peripheral search is then carried out by using the set distance (step ST34). More specifically, the facility search unit 50 expresses the set distance acquired in step ST33 from the point shown by the node ID acquired in step ST23 as a distance d3, and acquires the pieces of facility information about the facilities existing in an area at this distance d3 or less from the point.

Whether or not the process on all the node IDs has been completed is then checked to see (step ST35). More specifically, the facility searching unit 50 checks to see whether or not the process on all the node IDs acquired in step ST23 has been completed. When it is determined, in this step ST35, that the process on all the node IDs has not been completed, the navigation device returns the sequence to step ST31 and then repeats the above-mentioned processing. In contrast, when it is determined, in step ST35, that the process on all the node IDs has been completed, the navigation device ends the processing.

Through the above-mentioned processing, the navigation device can exclude facilities which the vehicle can reach with an increased cost only when going out from an exit of the dedicated road to a local street from the search target. In this case, by setting the set distance to "0", the navigation device does not make a search for facilities which the vehicle can reach only when going out from an exit of the dedicated road. Therefore, the navigation device can exclude facilities which provide a large cost increase from the search target.

The setting table shown in FIG. 10 can be configured in such a way as to have a plurality of setting tables while associating them with facility search conditions respectively, as shown in, for example, FIGS. 11(*a*) to 11(*c*). Furthermore, although not shown in the figures, the setting table can be configured in such a way as to have a plurality of setting tables according to the amount of money which the user will spend in each of the facilities searched for (e.g., the prices of objects to be purchased).

Embodiment 3

Although the user usually uses a parking lot in a service area (SA) or a parking area (PA) when reaching a facility on a dedicated road, there may be a case in which when the parking lots of the service area or the parking area are crowded and therefore the user cannot park his or her vehicle, it is more convenient to use a facility in the next service area or parking area with respect to time. A navigation device in accordance with Embodiment 3 is configured in such a way as to support such a case.

The hardware configuration and functional structure of the navigation device in accordance with Embodiment 3 of the present invention are the same as those of the navigation device in accordance with Embodiment 1 shown in FIGS. 1 and 2 respectively.

Next, the operation of the navigation device in accordance with Embodiment 3 of the present invention will be explained. A facility searching process carried out by this navigation device is configured in such a way that the process of merging facility search results in step ST26 of the flow chart of the facility searching process carried out by the navigation device in accordance with Embodiment 1 shown in FIG. 5 is changed as follows.

Figure 12:
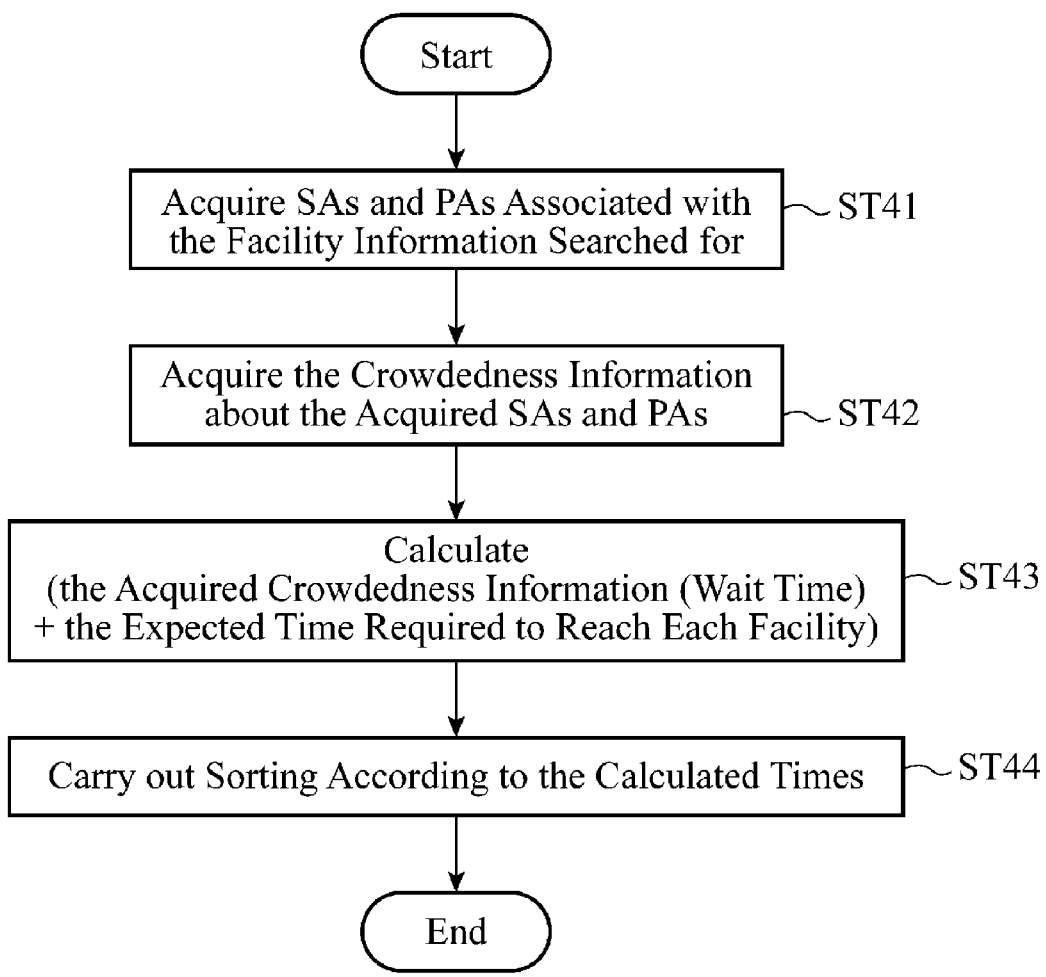
FIG. 12 is a flow chart showing a process of merging facility search results which is carried out in a facility searching process carried out by a navigation device in accordance with Embodiment 3 of the present invention.

FIG. 12 is a flow chart showing the process of merging facility search results. In this process, service areas (SA) or parking areas (PA) associated with facility information searched for are acquired first (step ST41). More specifically, a facility searching unit 50 acquires the IDs of service areas or parking areas where facilities shown by pieces of facility information acquired in step ST24 exist respectively from these pieces of facility information. It is assumed that the pieces of facility information about a dedicated road include the IDs of service areas or parking areas to which the facilities shown by the pieces of facility information belong respectively.

Then, crowdedness information about the acquired service areas and crowdedness information about the acquired parking areas are acquired (step ST42). More specifically, the facility searching unit 50 acquires crowdedness information about the acquired service areas and crowdedness information about the acquired parking areas which are shown by the information showing the service areas and the parking areas acquired in step ST41. The crowdedness information includes, for example, a wait time for temporary parking, is provided by a server of the service company which manages the dedicated road (e.g., a highway), and can be acquired through a WEB service which has been provided previously.

Then, the sum of the acquired crowdedness information (waiting time) about each facility and an expected time required to reach each facility is calculated (step ST43). More specifically, the facility searching unit 50 determines the expected time required to travel from the vehicle position to each facility and adds this determined expected time to reach each facility and the time limit acquired, in step ST42, as the crowdedness information, and then sends the addition result to a display control unit 43 as the time required to travel from the vehicle position to each facility.

Figure 13:
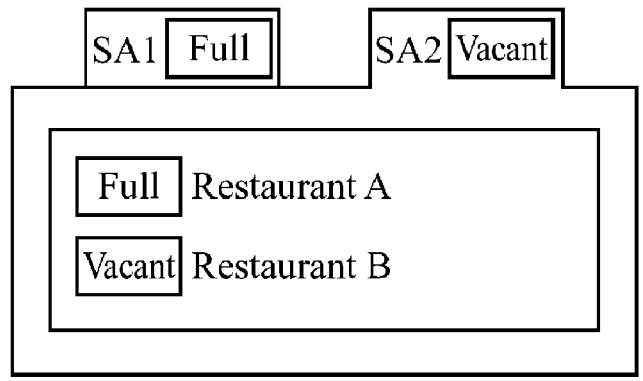
FIG. 13 is a view showing a display example of the facility search results displayed by the navigation device in accordance with Embodiment 3 of the present invention.

Then, sorting is carried out according to the calculated times (step ST44). More specifically, the display control unit 43 sorts the pieces of facility information received from the facility searching unit 50 in increasing order of the times required to travel from the vehicle position to the facilities respectively, and sends the sorted pieces of facility information to a display unit 32. Accordingly, the facilities searched for are displayed on the display unit 32 in increasing order of the times required to travel from the vehicle position to the facilities respectively. In this case, as shown in FIG. 13, the navigation device can be configured in such a way as to show whether or not the parking lots are full for each service area, and, as to a service area having vacant parking lots, also shows whether or not the parking lots are full for each facility.

The navigation device in accordance with above-mentioned Embodiment 3 is configured in such a way as to acquire the crowdedness information about service areas or parking areas through a WEB service. As an alternative, the navigation device in accordance with above-mentioned Embodiment 3 can be configured in such a way as to store data which have been estimated (predicted) from the past crowdedness and which have been categorized by the day of the week, time, and date in the map information beforehand, and use the data stored in this map information, though the degree of accuracy of the data drops because the data are not real-time data.

Furthermore, the navigation device in accordance with above-mentioned Embodiment 3 can be configured in such a way as to take into consideration, instead of the crowdedness of the parking lots of each service area or each parking area, information (a wait time) about the crowdedness of each facility (each store). This variation can be implemented by replacing the wait time for the parking lots of each facility with the wait time for each store.

In addition, although the navigation device in accordance with above-mentioned Embodiment 3 sets facilities which enable the user to use parking lots of a service area or a parking area on a dedicated road as the target to be searched for, the navigation device in accordance with above-mentioned Embodiment 3 can be configured in such a way as to use the wait time for parking lots (parking lots disposed in a facility or parking lots located in the vicinity of a facility) or the wait time for facility in a case of facilities searched for and located in the vicinity of an exit of a dedicated road.

Industrial Applicability

As mentioned above, in order to be able to ideally search for facilities which a user desires in a short time to present them to the user even if the vehicle is travelling along a dedicated road, the navigation device in accordance with the present invention is configured in such a way as to include: the map information acquiring unit for acquiring map information; the positioning unit for measuring a vehicle position; the input unit for inputting a search condition for a search for facilities which are search objects; the facility searching unit for, when the vehicle position measured by the positioning unit is located on a dedicated road whose exits and entrances are predetermined, searching through the map information acquired by the map information acquiring unit for facilities existing on the dedicated road and facilities existing at a predetermined distance or less from an exit of the dedicated road, those facilities satisfying the search condition inputted from the input unit; and the display unit for displaying the facilities searched for by the facility searching unit in order of increasing distance from the vehicle position measured by the positioning unit. Therefore, the navigation device in accordance with the present invention is suitable for use as a car navigation device which is used when a vehicle travels along a dedicated road, and so on.

The invention claimed is:

1. A navigation device comprising:
 a map information acquiring unit for acquiring map information;
 a positioning unit for measuring a vehicle position;
 a route determining unit for determining a route from a place of departure to a destination;
 an input unit for inputting a search condition for a search for facilities which are search objects;

a facility searching unit for, when the vehicle position measured by said positioning unit is located on a dedicated road whose exits and entrances are predetermined, searching through the map information acquired by said map information acquiring unit for facilities existing on said dedicated road and facilities existing at a predetermined distance or less from an exit of said dedicated road, those facilities satisfying the search condition inputted from said input unit; and a display unit for displaying the facilities searched for by said facility searching unit in order of increasing distance from the vehicle position measured by said positioning unit, wherein said facility searching unit changes the predetermined distance from the exit of said dedicated road according to both the vehicle position measured by said positioning unit and a setting state of the route determined by said route determining unit to carry out the search.

2. The navigation device according to claim 1, wherein the display unit displays the facilities existing on the dedicated road and the facilities existing at the predetermined distance or less from the exit of said dedicated road, those facilities being searched for by the facility searching unit, while distinguishing between the facilities existing on the dedicated road and the facilities existing at the predetermined distance or less from the exit of said dedicated road.

3. The navigation device according to claim 1, wherein the facility searching unit changes the predetermined distance from the exit of the dedicated road according to the search condition inputted from the input unit to carry out the search.

4. The navigation device according to claim 1, wherein the facility searching unit changes the predetermined distance from the exit of the dedicated road according to a distance from the vehicle position measured by the positioning unit to the exit of the dedicated road to carry out the search.

5. The navigation device according to claim 1, wherein the facility searching unit changes the predetermined distance from the exit of the dedicated road according to whether or not the route determined by said route determining unit is set to carry out the search.

6. The navigation device according to claim 1, wherein the facility searching unit changes the predetermined distance from the exit of the dedicated road according to a distance from the destination to the exit of the dedicated road to carry out the search when the route determined by said route determining unit is set.

7. The navigation device according to claim 1, wherein the facility searching unit changes the predetermined distance from the exit of the dedicated road according to a road use charge of the dedicated road which increases when going out of the exit of the dedicated road to carry out the search when the route determined by said route determining unit is set.

8. The navigation device according to claim 7, wherein the input unit inputs an amount of money which will be spent in a facility searched for, and the facility searching unit changes the road use charge of the dedicated road which increases when going out of the exit of the dedicated road according to the search condition or the amount of money which is inputted by said input unit.

9. The navigation device according to claim 1, wherein the display unit changes order in which to display the facilities existing on the dedicated road according to crowdedness of service areas or parking areas existing on the dedicated road.

10. The navigation device according to claim 1, wherein the display unit changes order in which to display the facilities existing on the dedicated road according to crowdedness of the facilities existing on the dedicated road.

* * * * *